(12) United States Patent
Sørensen

(10) Patent No.: US 8,267,651 B2
(45) Date of Patent: Sep. 18, 2012

(54) PITCH OF BLADES ON A WIND POWER PLANT

(75) Inventor: Tommy Sørensen, Lemming (DK)

(73) Assignee: LM Glasfiber A/S, Kolding (DK)

( * ) Notice: Subject to any disclaimer, the term of this patent is extended or adjusted under 35 U.S.C. 154(b) by 577 days.

(21) Appl. No.: 12/516,542

(22) PCT Filed: Nov. 27, 2007

(86) PCT No.: PCT/DK2007/000521
§ 371 (c)(1),
(2), (4) Date: Jul. 2, 2009

(87) PCT Pub. No.: WO2008/064678
PCT Pub. Date: Jun. 5, 2008

(65) Prior Publication Data
US 2010/0092288 A1   Apr. 15, 2010

(30) Foreign Application Priority Data
Nov. 27, 2006   (DK) ................................ 2006 01554

(51) Int. Cl.
*B64C 9/00* (2006.01)
(52) U.S. Cl. ............. 416/1; 416/205; 416/248; 416/239
(58) Field of Classification Search .................. 416/147, 416/148, 204 R, 205, 238, 248, 132 R, 132 B, 416/135, 138, 239, 1
See application file for complete search history.

(56) References Cited

U.S. PATENT DOCUMENTS

| 4,201,514 | A * | 5/1980 | Huetter | 416/37 |
| 6,619,918 | B1 * | 9/2003 | Rebsdorf | 416/1 |
| 2004/0057828 | A1 * | 3/2004 | Bosche | 416/1 |
| 2006/0045743 | A1 * | 3/2006 | Bertolotti et al. | 416/143 |
| 2006/0067827 | A1 * | 3/2006 | Moroz | 416/204 R |

FOREIGN PATENT DOCUMENTS

DE   19963252 A1 * 7/2001
(Continued)

OTHER PUBLICATIONS

International Search Report; International Application No. PCT/DK2007/000521; Completed Sep. 23, 2008.
International Preliminary Report on Patentability; International Application No. PCT/DK2007/000521; Completed May 29, 2009.

*Primary Examiner* — Edward Look
*Assistant Examiner* — Christopher R Legendre
(74) *Attorney, Agent, or Firm* — Nath, Goldberg & Meyer; Jerald L. Meyer; Robert T. Burns

(57) ABSTRACT

The present invention relates to a blade for a wind power plant with an assembly face for mounting in a circular pitch bearing, whose pitch axis is angled relative to the longitudinal axis of the blade, and wherein the blade comprises a root part with an approximately elliptic cross-section, in which root part the assembly face is arranged. The invention further relates to a wind power plant in general having a pitch-adjustable blade mounted in a pitch bearing such that the distance between the outermost part of the blade and the tower is increased when the leading edge of the blade is pitched up in the wind. This is accomplished in that the longitudinal axis of the blade is angled in a particular way compared to its pitch axis. The invention also relates to a method of controlling a wind power plant, including to increase the rotor area and/or increasing the distance between the outermost part of at least one blade and the tower by regulating, during operation, the pitch of a blade about a pitch axis which is angled relative to the longitudinal axis of the blade.

14 Claims, 9 Drawing Sheets

FOREIGN PATENT DOCUMENTS

| | | |
|---|---|---|
| EP | 1019631 A1 | 7/2000 |
| FR | 2863318 A1 | 6/2005 |
| NL | 1014719 C2 | 9/2001 |
| WO | WO 03060319 A1 | 7/2003 |
| WO | WO 2005/068833 A2 | 7/2005 |

* cited by examiner

PITCH OF BLADES ON A WIND POWER PLANT

CROSS-REFERENCE TO RELATED APPLICATIONS

This application is a national phase application of PCT Application No. PCT/DK2007/000521, filed on Nov. 27, 2007, titled "Pitch of blades on a wind power plant", which, in turn claims priority to Danish Patent Application No. PA200601554, filed on Nov. 27, 2006, titled "Pitch of blades on a wind power plant." The subject matter of both of these applications are incorporated herein by reference for all purposes.

BACKGROUND

The various embodiments of the invention relate to a blade for a wind power plant and a wind power plant comprising a tower and a rotor with a number of blades, of which at least one blade is mounted to be pitch-adjustable in a pitch bearing. Moreover, the various embodiments of the invention relate to methods of controlling such wind power plant.

The achievable electricity output of a wind power plant depends directly on the size of the rotor area and hence on the effective length of the blades. A blade which is 1% shorter will thus result, as a rule of thumb, in a 2-3% lower electricity output. As a result of efforts to save material and weight, the blades of a wind power plant are often very flexible, and the flexing due to the wind may thus be quite comprehensive. It follows that the deformation of the blades lead to a reduction in the rotor area and hence to an undesirable reduction in the power yield.

Moreover, the deformation of the blades is often a limiting dimensioning factor to the design of new wind power plants, as one has to make sure that the blades do not hit the tower. Positioning of the rotor a further distance from the tower is not desirable, as an increased length of the main shaft giving rise to a larger momentum on the tower and hence to undesirable forces in is gears and bearings in the hub.

Depending on the velocity of the wind, it may thus be desirable to both increase the rotor area to better utilize the wind and to increase the power output (at low wind velocities) and to change the shape of the blades in order to avoid them hitting the tower (at high wind velocities).

It is known from EP 1019631 to manufacture pre-curved blades that partially compensate for the flexing caused by the wind. However, the complete useful length of the blade is still achieved only at precisely the specific design wind velocity. At all other wind velocities the blade will still either flex up into the wind or rearwards.

Other methods of ensuring that the blades stay clear of the tower is by coning where the blades are mounted forwards into the wind, forming a cone, or by tilting where the main shaft as such is, with its entire rotor plane, turned upwards in the order of about 5°. However, both of these construction methods entail a reduction in the effective rotor area compared to blades of a specific length and hence a reduction in the achievable power yield.

A wind power plant regulates the power uptake at different wind velocities by means of the blades in accordance with three methods.

Like a plane may lose lift and stall, a blade can be turned to lose lift and the output of the rotor can be reduced. On passively stall-adjusted turbines, each blade is fixedly mounted on the hub in a specific angle of attack. The blade is constructed such that turbulence is generated on the rear side when it is very windy. Such stall discontinues the lift of the blade. The more powerful the wind, the heavier the turbulence and the ensuing braking effect, whereby the power output of the blade is regulated.

Actively stall-adjusted wind turbines turn the rear edge of the blade a few degrees up into the wind (negative pitch angle) when they regulate the output. It takes place by the entire blade being turned (pitched) about its own axis—most often by means of a hydraulic system.

The majority of rotors on recent and large wind power plants are pitch-adjusted. Here the power output is regulated in accordance with the wind conditions in that the leading edge of the blade is turned up into the wind (positive pitch angle) as opposed to the above actively stall-adjusted turbines that turn the rear end of the blade up into the wind.

SUMMARY

Various embodiments of the invention provide a wind power plant to obviate the above-mentioned problems of reducing the effective rotor area and clearance between blade and tower.

In one aspect, the invention thus relates to a blade for a wind power plant, which blade comprises a circular pitch bearing with a pitch axis angled relative to the longitudinal axis of the blade. The blade comprises a root part with an approximately elliptic cross-section approximately perpendicular to the longitudinal axis of the blade, in which root part the circular pitch bearing is arranged where the cross-section is approximately elliptic. The pitch axis being angled relative to the longitudinal axis of the blade, the advantageous aspect is accomplished that a blade mounted on a wind power plant can be moved into and out of the rotor plane when pitched. For instance, this enables control and regulation of the clearance between blade and tower during tower passage by pitching of the blade, and, likewise, the rotor area can be optimized by pitching. More and other advantages will appear from the below. The elliptical cross-section of the root part of the blade is advantageous in that a blade is accomplished that has an approximately smooth, uninterrupted and continuous transition across the pitch bearing, albeit turned compared to its usual position where it sits perpendicular to the longitudinal axis of the blade. Moreover, a very simple construction may provide a blade that can be pitched about other axes than that of the blade—merely by a simple adaptation of the shape of the blade root.

In another aspect, the present invention relates to a blade, wherein the pitch bearing is arranged a distance down the blade so that only the outermost part of the blade is pitched. This is advantageous in that the pitch bearing can be constructed to be smaller since it is not to be able to turn so much substance. Likewise, it is possible to pitch the blade quicker In yet another aspect, the invention relates to a wind power plant comprising a tower and a rotor with a number of blades of which at least one pitch-adjustable blade is mounted turnably in a pitch bearing, and wherein the longitudinal axis of at least one blade is angled relative to its pitch axis, whereby the distance between the outermost part of the blade and the tower is increased when the leading edge of the blade is pitched upwards in the wind. Hereby the advantageous aspect is accomplished that it is possible to move the entire or a part of each blade in a more complex and advanced manner than conventional pitch-adjusted turbines, where, by pitching, the blades can be turned about their longitudinal axis only. Hereby improved control of the wind power plant as a function of wind velocities and rotation rates is enabled.

By angling the pitch axis in this manner, a movement in and out of the rotor plane is accomplished, whereby the clearance between a blade and the tower can be increased. Being able to increase the distance between blade and tower during tower passage presents a major advantage, as it can be done continuously and gradually in operation to the requisite extent. Hereby tilting, coning and pre-curving are made completely or partially superfluous, the same output being obtainable in an alternative manner by pitching of the blades. Thus, e.g., a permanent coning may be imparted to a wind power plant by providing the rotor with pitch bearings in accordance with the invention and which are set in advance to a permanent pitch. It is further enabled that the blades can be made lighter since a larger blade flexing is acceptable without an ensuing risk of tower collision, due to the pitching as taught by various embodiments of the invention. Hereby savings on material can be obtained in the manufacture of the blades, and forces influencing hubs, bearings and gears are reduced. It is a further option that the increased clearance can be utilized to make the blades longer and hence increase the power output of the wind power plant. Alternatively the rotor can be moved closer to the tower, whereby the main shaft can be made shorter, which is also a major structural advantage. A further considerable advantage of the above disclosures is that the pitching of the blade more or less forwards into the wind results in an increase in the effective rotor area which is otherwise reduced as a consequence of the flexing of the blades caused by the wind. An increased rotor area entails a considerable increase in the possible power output of the rotor and utilization of the wind.

According to one embodiment of the invention, the pitch axis of the at least one blade is angled out of the rotor plane and/or angled at an angle opposite the direction of rotation relative to the longitudinal axis of the blade. Hereby it is accomplished that the blade can be moved in different ways into and/or out of the rotor plane merely by being pitched, whereby the possibilities for controlling and regulating the wind power plant can be increased considerably. For instance, pitching can make a blade turn upwards and away from the tower, whereby the thrust impact, power fluctuations, vibrations and the noise deriving from the tower passage are reduced. One option enabled by pitching according to an embodiment of the invention is to also turn the blade such that it passes the tower staggered or gradually. This also reduces the thrust impact, force fluctuations, vibrations and the noise.

According to a further embodiment the wind power plant further comprises a blade as described above. The advantages of this are as described for the blade.

According to one embodiment the wind power plant further comprises one or more wind velocity meters for measuring the velocity of the wind, one or more position meters for measuring the position of at least one blade and/or one or more distance meters for measuring the distance of at least one blade to the tower, which parameters are used to control the pitch of at least one blade. Hereby it is provided in a simple manner that the clearance between blade and tower can be controlled and regulated continuously during operation by pitching of the blades. Likewise, the embodiment makes it possible to take into account the wind profile and to adjust the blade profiles optimally, from an aerodynamic point of view, in all positions of the revolution path.

In yet another aspect, the present invention relates to a method of controlling a wind power plant comprising that the rotor area of the wind power plant is increased during operation by regulating the pitch of the blade about its pitch axis which is angled relative to the longitudinal axis of the blade. The advantages of this are as described above in the context of the wind power plant.

In one aspect, the invention relates to a method of controlling a wind power plant including that the distance between the outermost part of at least one blade and the tower is increased in operation by regulation of the pitch of the blade about its pitch axis which is angled relative to the longitudinal axis of the blade. The advantages of this are as described above.

Further, an embodiment relates to a method of controlling, whereby the velocity of the wind is used to adjust the pitch of at least one blade. Hereby it is accomplished that higher wind velocities can be utilized—also where wind gusts are concerned, the pitch of the blades being continuously adjustable for optimizing the setting of the blade from a purely aerodynamic point of view and to regulate the output. Likewise, the clearance to the tower can be ensured continuously to a requisite extent at all wind velocities.

A further embodiment relates to a method of controlling in accordance with the above, where each blade is pitched individually, and/or that the pitch of a blade is changed cyclically, e.g., between −10 and +30 degrees. Hereby the drawbacks brought about by the tower shadow, such as noise, load variations, and wind gusts on the blades, and vibrations, are considerably reduced. Moreover, individual and cyclical pitch makes it possible to take the wind profile into account to the effect that each blade can be pitched to be set aerodynamically optimally in view of the actual wind experienced by the blade and varying throughout a revolution.

Finally, the present invention relates to use of pitching of at least one blade on a wind power plant for controlling and adjusting the distance between the outermost part of at least one blade and the tower, and/or for controlling and adjusting the rotor area of the wind power plant. The advantages of this are as described above.

DESCRIPTION OF DRAWINGS

In the following, the various embodiments of the invention will be described with reference to the figures, wherein.

DETAILED DESCRIPTION

Figure 1:
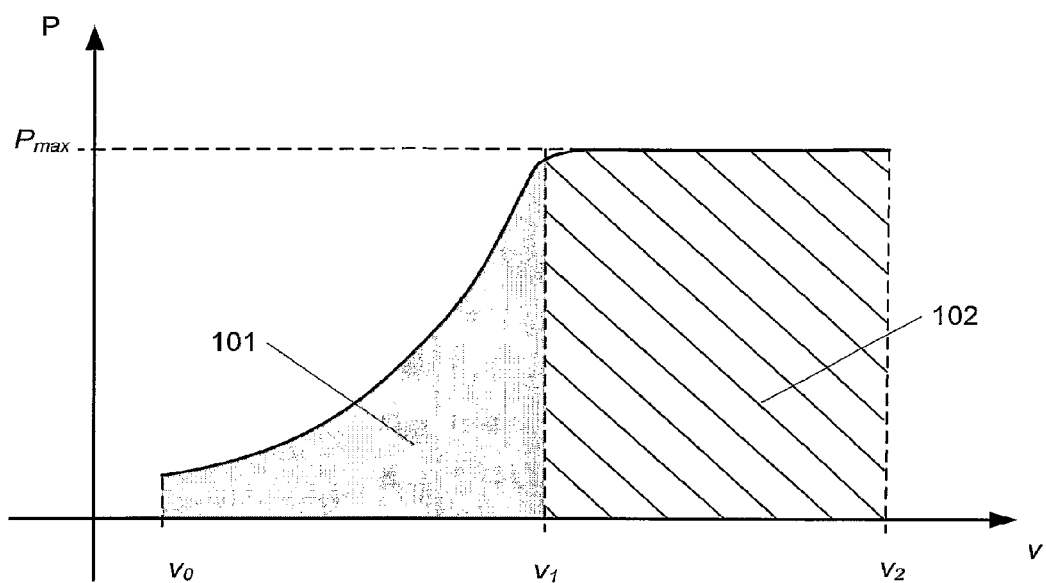
FIG. 1 shows a typical output curve for a wind power plant.

FIG. 1 schematically shows a typical output curve for a wind power plant. The curve shows the achieved power P as a function of the wind velocity v. The wind power plant starts to produce current at a starting wind with velocity $v_0$, where, in case of pitch-adjusted and actively stall-adjusted pitches, it often takes a pitch of 5° to start the rotor. Here and in the following, a positive pitch angle is defined by the leading edge of the blade profile being turned up into the wind, as also outlined more detailed in the following FIG. 3. From here, the power output increases with increasing wind velocities, until the velocity $v_1$. Within this range 101, the wind power plant is constructed to maximize the power yield and productivity of the wind power plant. At the wind velocity $v_1$, the wind power plant yields the maximum power $P_{max}$. The magnitude of the velocity $v_1$ depends on different factors, such as financial factors including, e.g., the size of the generator and local wind conditions where the wind power plant is to be erected. From that wind velocity $v_1$ and until the stop wind $v_2$, the wind power plant is constructed to yield a constant maximum power $P_{max}$ which is accomplished either—like pitch-adjusted blades—by gradually increasing the pitch of the blades as a function of the wind velocity or by allowing the blades to stall more and more. The latter is accomplished either automatically due to the design of the blade (passively stall-adjusted blades) or by imparting a negative pitch angle to the blades, where the rear edge of the blade profile is turned up into the wind (actively stall-adjusted blades). Conventionally, a blade is pitched within the range of between about −5° and +25-30°. The additional power that could in fact be extracted at the higher wind velocities is usually not exploited as it is not financially viable compared to, on the one hand, the frequency with which such high wind velocities occur and, on the other, the additional production costs entailed by the correspondingly higher wind loads will entail in terms of stronger gears, tower, generator, etc. Within this range 102, at velocities between $v_1$ and $v_2$, the wind power plant is thus usually constructed to minimize the loads on the wind power plant for maintained power. Likewise, the wind power plant with relatively flexible blades is often also dimensioned to take into account that the blades must not be deformed and flex so much that they may hit the tower (dimensioned with regard to flexing) which is a considerable parameter precisely in the area 102 at the high wind velocities.

Figure 2:
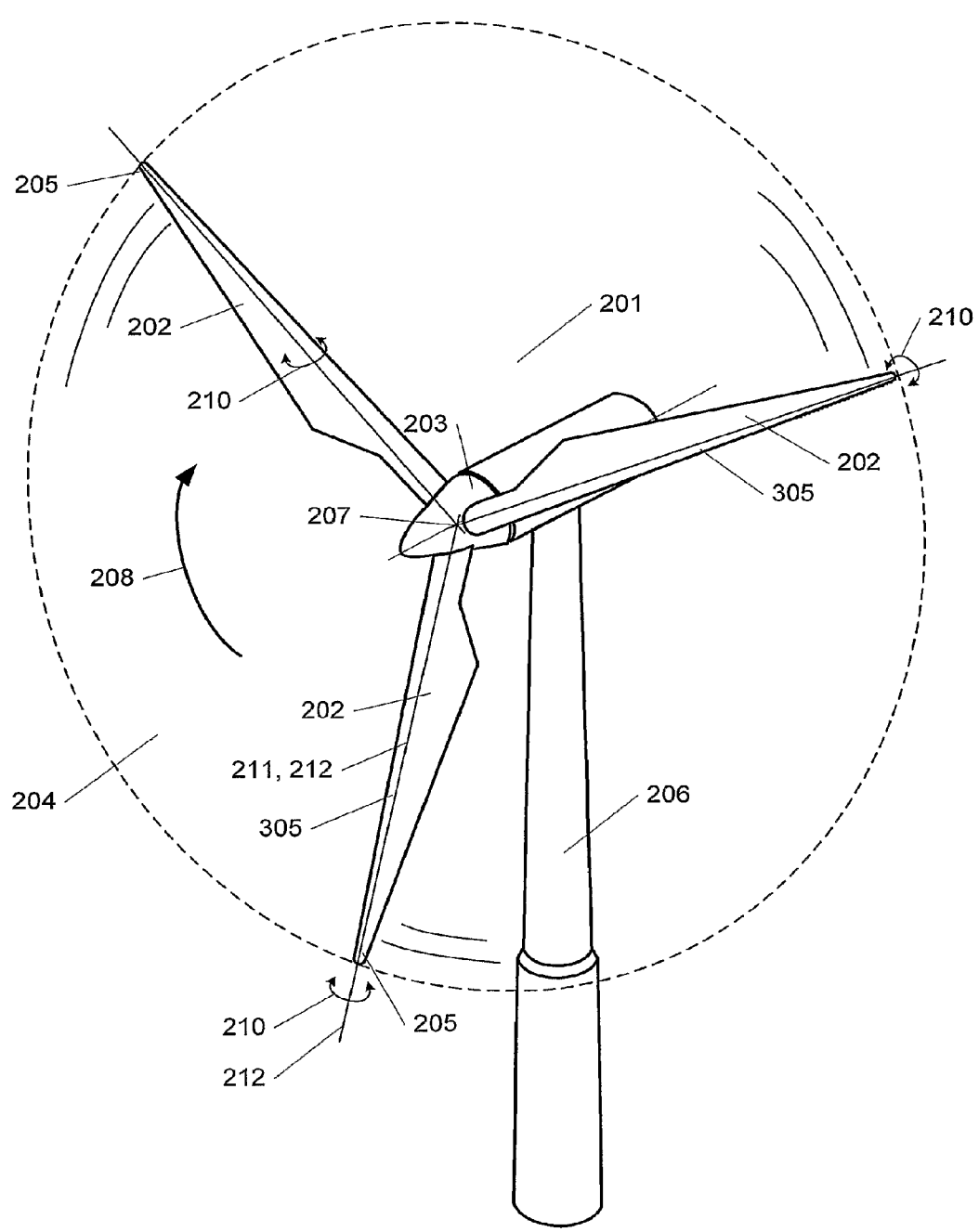
FIG. 2 shows a wind power plant, seen in an inclined front view, with pitchable blades as prior art.

FIG. 2 shows a wind power plant 201 with a rotor 203 having three blades 202 rotating about the main shaft and the centre of rotation 207 of the rotor and with a direction of rotation as shown by the arrow 208. The size of the rotor plane 204—the area swept by the blades 202—is a codetermining factor in the amount of energy that can be extracted from the wind by the wind power plant and hence in its power yield. A rule of thumb says that a radius which is 1% smaller will entail a reduction of 2-3% in the amount of power produced. The effective length of the blades is thus crucial to the productivity of a wind power plant. Depending on which material the blades 202 are made of, they may possess a considerable flexibility, which in turn leads to comparatively large deformations and flexings of the outermost parts of the blades 205 due to the wind loads. As an example, a 30 meter glass fiber blade may flex as much as 6 m in case of wind velocities corresponding to ordinary operating conditions. The flexing hereby considerably reduces the rotor area 204. It is also clear that it is important to take the flexing of the blades into account in the construction and dimensioning of the turbine to avoid that the blades are able to collide with the tower 206.

FIG. 2 also outlines how the blades 202 are pitched 210 by being turned about their longitudinal axis 211 which, in this case, coincides with their pitch axis 212. Thus, the rotor plane 204 is not changed by a blade being pitched 210. This will become more apparent from FIG. 3 which is a sectional view showing a section of the tower 206, seen from above and down towards the ground. The line and arrow 301 illustrate the movement of a blade 202 past the tower 206. A blade profile 301 has been drawn, corresponding to its position on the one hand at a pitch-turning of 0° (302) and, on the other, at a positive pitch angle 304 where the leading edge 305 of the blade profile is turned up into the wind 306.

Figure 4:
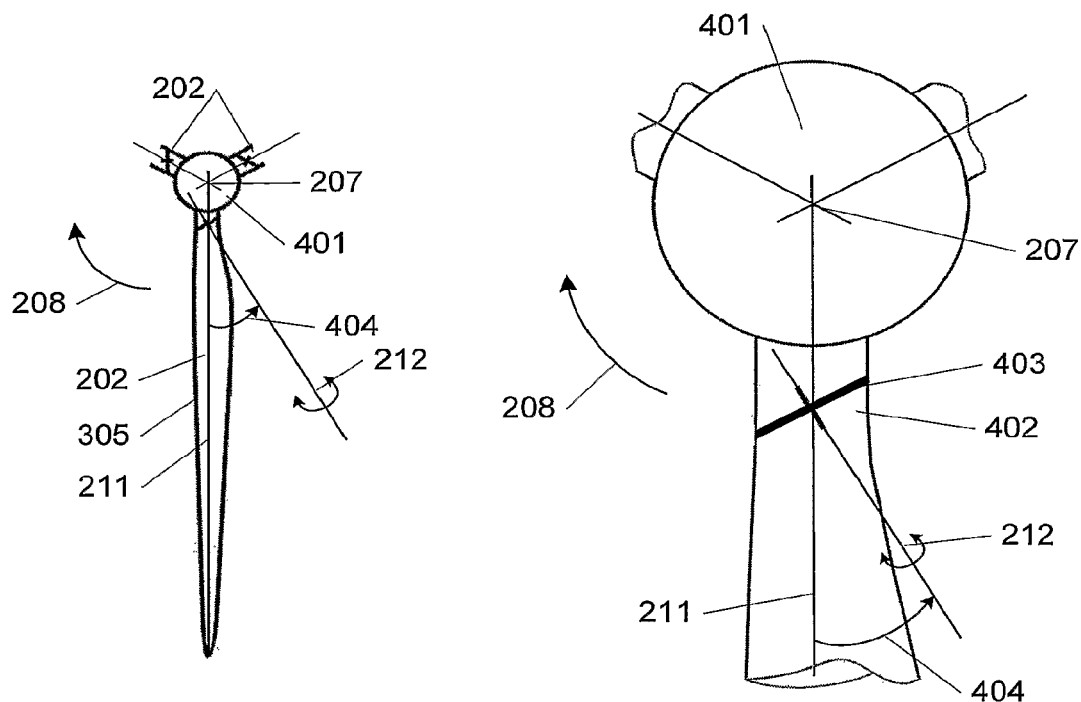
FIG. 4 is a sectional view of a wind power plant, from the hub and downwards, seen in a front view, and with a pitch axis according to an embodiment of the invention.

FIG. 4 shows a part of a wind power plant, seen in a front view into the rotor hub 401 and with pitchable blades 202 according to an embodiment of the invention. Only the one blade 202 is completely shown, but the locations of the remaining two are hinted. To the left in the figure, a larger section with rotor hub 401 and the blade root 402 and pitch bearing 403 of the one blade root is shown. As shown in the figure, the pitch axis 212 of the blade 202 does not extend through the centre of rotation 207 of the rotor. In the shown embodiment the pitch axis 212 is furthermore angled relative to the longitudinal axis 211 of the blade, and the pitch bearing 403 is thus correspondingly no longer perpendicular to the longitudinal axis 211 like in conventional pitch or actively stall-regulated turbines. Here, compared to the longitudinal axis 211 of the blade, the pitch axis 212 is angled at an angle 404 opposite the direction of rotation 208. When the blade 202 is pitched about the pitch axis with the leading edge 305 up into the wind, like a stall-adjusted turbine at elevated wind velocities, the blade is simultaneously turned forwards and out of the original rotor plane. Hereby the distance between the blade tip and the tower is increased, and the risk of tower collision is reduced considerably. At the same time the movement of the blade forwards into the wind simultaneously with the blade flexing due to the pressure of the wind means that the effective rotor area (the area swept by the blade during a rotation) is increased. This further means that the performance of the rotor and the amount of energy extracted by the wind power plant from the wind is increased considerably. How much the blade is turned outwards and how much the clearance to the tower is increased depend on how much the pitch axis is angled relative to the longitudinal axis of the blade and how close to the centre of rotation the pitch bearing is located and, of course, on how many degrees are pitched.

By being able to move the blade by pitching in this manner, it is also possible to reduce the thrust impacts that will occur when each blade passes the tower. This can be done e.g. by pitching the blades cyclically and/or individually as a function of where in its revolution path the blade is located. Besides, the pitching can be used in the control of the wind power plant in combination with one or more wind meters to the effect that the distance of the blades to the tower is continuously regulated as a function of the measured wind velocity/velocities, deformations, or position by directly pitching the blades. Such regulation or control can also be performed on the basis of continuous or interval measurements by use of a position meter arranged on one or more blades or by means of distance meters that record the distance between the tower and a passing blade. A further option for regulating the pitch of a blade is to use strain gauges on or in the blades, which can be used to determine parameters, such as flexings, strains and deformations of the blade.

A further advantage of a pitch axis as described by the invention is that the blades of a wind power plant can be set in advance to an initial pitch angle of a certain magnitude and hence with a blade turning which is optimal compared to the wind conditions and local conditions (e.g., turbulent-prone areas) under which the wind power plant is to operate. A pitching of the blades may, as also mentioned above, also be used in replacement of or as an alternative to a method for obtaining the same output as by a rotor with coning or pre-curved blades.

It is also an embodiment of the invention to arrange the pitch bearing a distance down the blade to the effect that only the outermost part of the blade is pitched. This may be advantageous in that, in that event, the pitch bearing can be constructed to be smaller since it is not to be able to turn so much substance. Likewise, it is possible to pitch the blade quicker. According to a further embodiment an angled pitch bearing as described above can also be combined with a conventional pitch bearing, where the blade is pitched about its own axis. Hereby the options of controlling the wind power plant optimally relative to the various wind conditions are increased and improved. A further option is to construct the rotor with several pitch bearings per blade, which may have the same or different pitch axes. For instance, this enables pre-setting of the one bearing to provide a coning effect, while the other one continuously regulates the pitch of the blade. According to yet an embodiment the pitch bearings could also be arranged with different distances to the centre of rotation of the rotor to the effect that, in some scenarios, the outermost pitch bearing imparts an extra pitch angle to the outermost part of the blade compared to the innermost (or vice versa).

Figure 3:
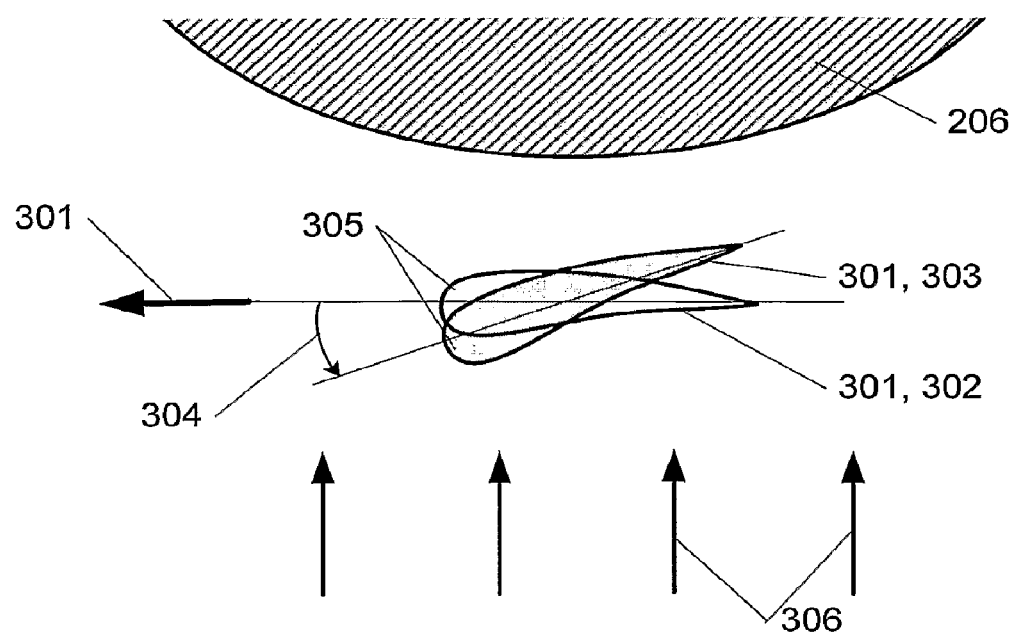
FIG. 3 shows the passage of a blade past the tower, seen from above, with and without pitch.
Figure 5:
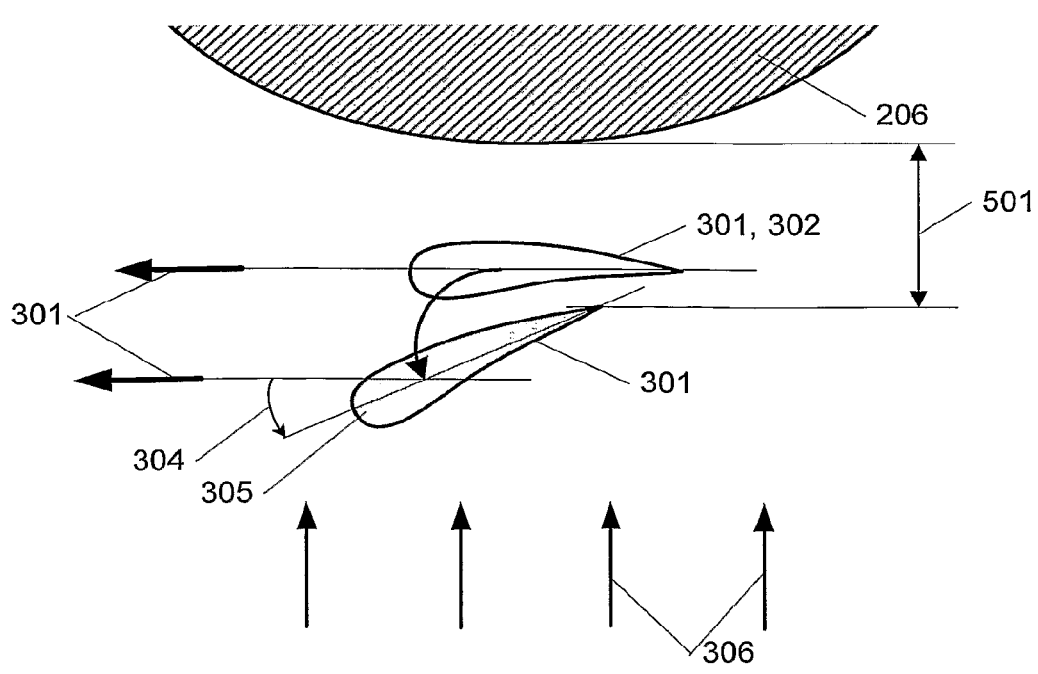
FIG. 5 shows the passage of a blade past the tower, seen from above, with and without pitch according to a pitch axis, as outlined in FIG. 4.
Figure 6:
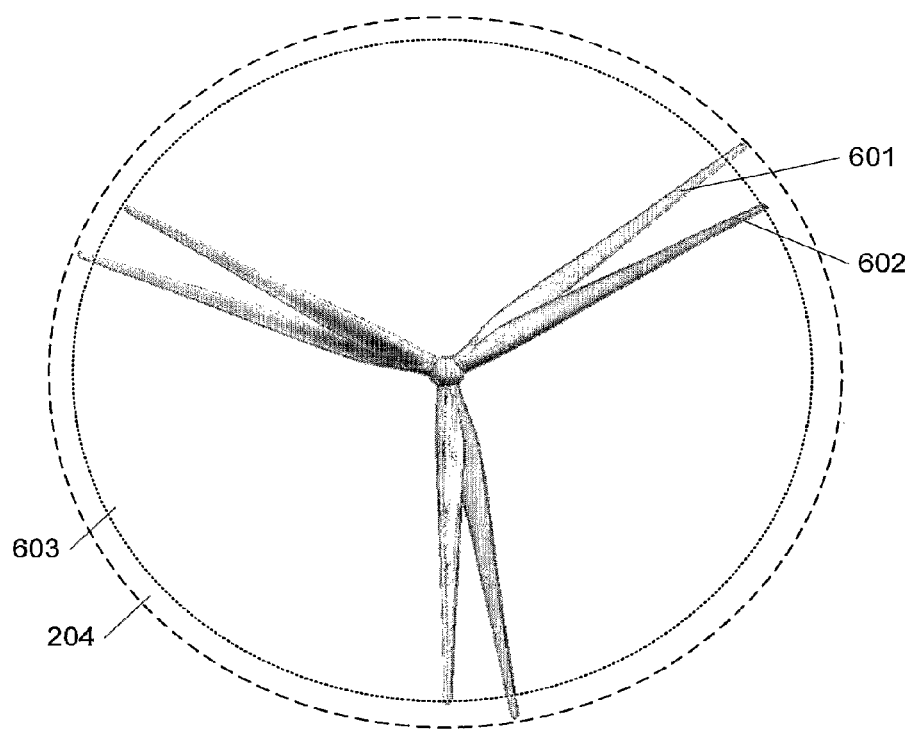
FIG. 6 illustrates the movement of the blades due to pitch according to an embodiment of the invention.

FIGS. 5 and 6 outline how the blade (all the blades in FIG. 6) is turned forwards and out of the original rotor plane due to pitch about an angled pitch axis oriented like in the preceding FIG. 4. Like FIG. 3, FIG. 5 shows a sectional view of the tower 206, seen from above and down towards the ground. The line and arrow 301 illustrate the movement of a blade 202 past the tower 206. A blade profile 301 is drawn, corresponding to its position on the one hand at a pitch turning of 0° (302) and, on the other, at a positive pitch angle 304 where the leading edge 305 of the blade profile is turned into the wind 306. As opposed to a conventional blade which is pitched about its longitudinal axis, here the pitching results in larger clearance 501 and distance between the blade 202 and the tower 206 during tower passage.

Seen in a front view, FIG. 6 shows two complete rotors with each three blades, on the one hand in non-pitched state 601 and, on the other, in a scenario where the same pitch 602 has been imparted to all the blades. Here, to each blade, the pitch axis is, in principle, oriented like in FIGS. 4 and 5. When the blades are pitched, the blades are turned, as will appear clearly from FIG. 6, onwards, up into the wind and out of the original rotor plane 204, and the distance to the tower (not shown) is increased. How much the blades turn onwards and out of the rotor plane depends on how much the pitch axis is angled, where the pitch bearing is arranged (upwards in the hub, how far on the blade), and how much pitching is performed. The figure also illustrates clearly that the area of the rotor plane 204, 603 changes by pitching in accordance with an embodiment of the invention. In the shown case the rotor area 603 seems to have been reduced compared to the original 204, but if the flexing of the blades in the wind is also taken into account which is most often, in response to blade material and construction, quite significant, the actual and final rotor area in case of pitched blades 603 can be considerably larger than in case of blades pitched in conventional manner. At the same time, the distance to the tower is increased.

Figure 7A:
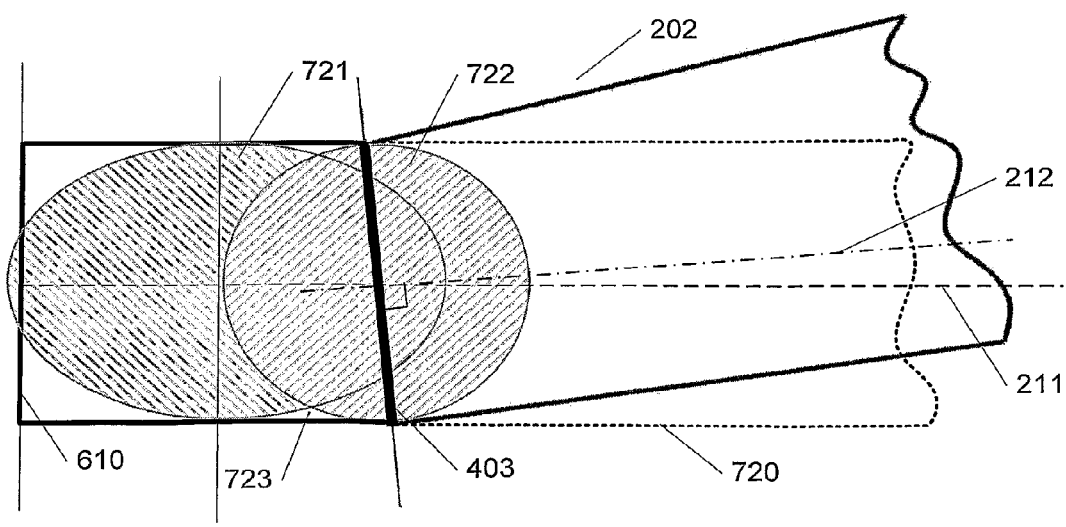
FIG. 7A shows an outline of the innermost part of a blade for a wind power plant with elliptic cross-section in accordance with an embodiment of the invention.
Figure 7B:
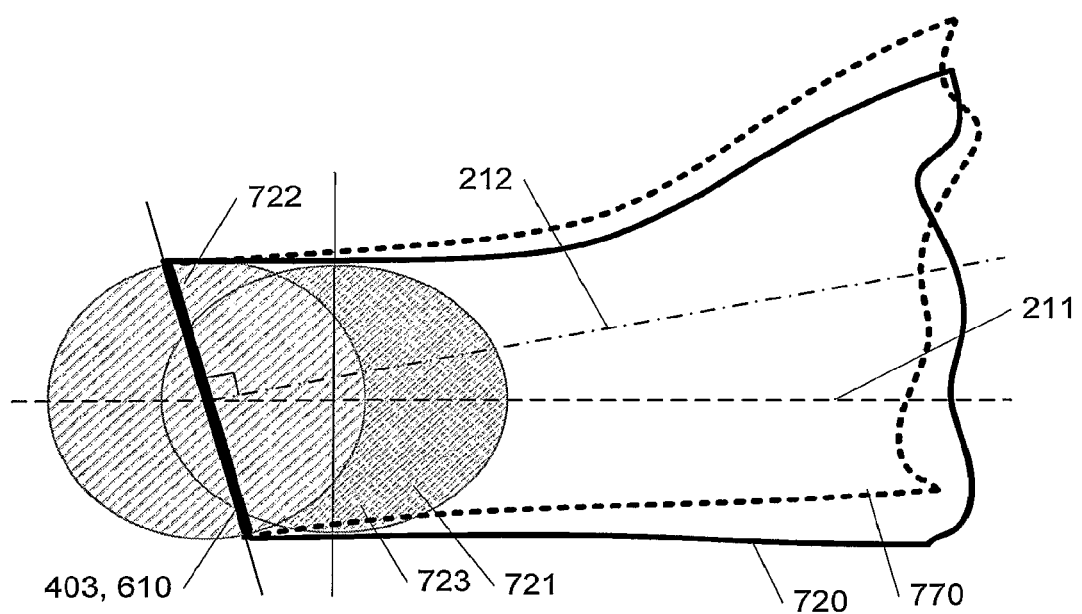
FIG. 7B shows an outline of the innermost part of a blade for a wind power plant with elliptic cross-section in accordance with a further embodiment of the invention.

FIGS. 7A and 7B show different embodiments of a blade 202 for a wind power plant configured with a pitch bearing 403 angled relative to the longitudinal axis 211 of the blade according to an embodiment of the invention. In general a pitch bearing can be arranged exclusively on the blade, exclusively as a part of the hub, in a transition element between hub and blade or by forming transition between blade and hub, which is also the case with pitch bearings according to the present invention. FIG. 7A shows the innermost part of a blade with a root plate 610 most distally where the blade is mounted on the hub and in a view directly onto the rotor. Here the blade is shown on the one hand pitched about a pitch axis 212 which is angled relative to the longitudinal axis 211 of the blade and, on the other, by dotted lines 720 in its non-pitched position. Conventionally the blade root of a blade has a circular cross-section whereby it concords with a circular root plate and a circular pitch bearing. A circular, but angled pitch bearing 403 is here obtained in a simple structural manner by configuration of the blade with a root part or an area 723 of elliptic cross-section (as outlined by hatching 721), whereby the root part 723, when cut 'askew', is able to form a circular cross-section and a circular assembly face 722 in which the pitch bearing can advantageously be constructed. The exact elliptic shape to be imparted to that part of the blade will depend on how much and how the pitch bearing and the pitch axis are angled relative to the longitudinal axis of the blade. The described configuration of the blade part is also advantageous in that it ensures uninterrupted and approximately smooth transition across the pitch bearing, independently of the pitch setting.

As mentioned, the pitch bearing can also be arranged as a part of the hub or as a transition element between hub and blade. However, the hub part or the transition piece can still advantageously be configured with an elliptic cross-section as shown in FIG. 7A for a blade.

FIG. 7B also outlines the innermost part of a blade 202 with a pitch axis 212 angled relative to the longitudinal axis 211 of the blade. Like in FIG. 7A, the blade is outlined in both its non-turned 720 and a pitched 770 position. In this embodiment the blade ends in a circular root end or assembly face 610 (as illustrated by the hatched cross-section 722), in which a circular pitch bearing 403 can be arranged. The root part or the innermost section 723 of the blade has, in this embodiment, too, an elliptic cross-section (as outlined by the hatched cross-section 721) to the effect that the circular root end will appear when the root part 723 is cut off or ends in an oblique angle.

As a further embodiment, an angled pitch axis as described by an embodiment of the invention can also be constructed by use of a rotatable shaft about which the blade is pitched. In that case, the shaft may be turned, e.g., by means of toothed wheels, propeller shafts or the like. Alternatively the pitching can be accomplished by means of pull bars and joints.

Figure 8:
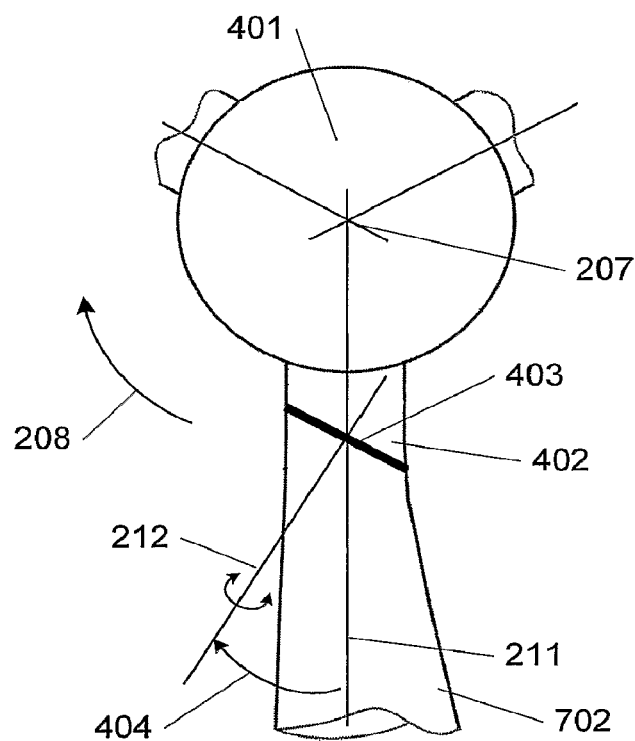
FIG. 8 is a cross-sectional view of a wind power plant around the hub, seen in a front view, and with a pitch axis according to an embodiment of the invention.
Figure 9:
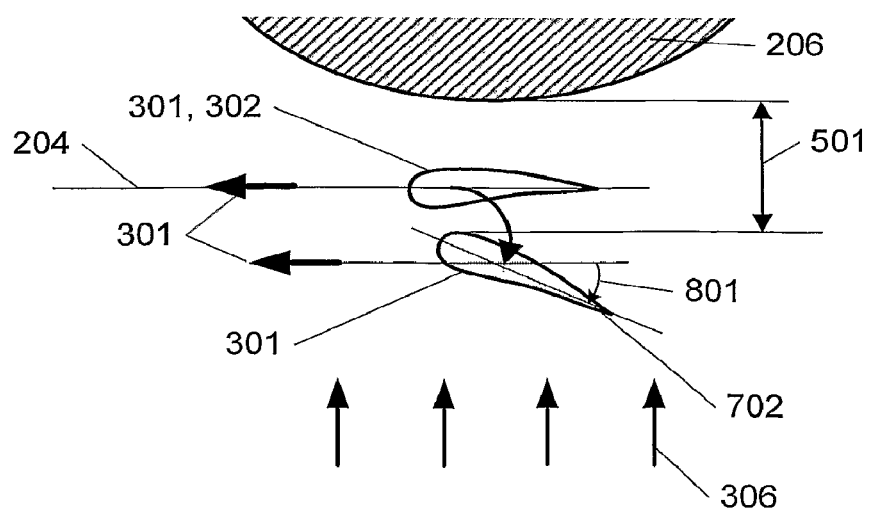
FIG. 9 shows the passage of a blade past the tower, seen from above, with and without pitch, in accordance with a pitch axis as outlined in FIG. 8.

FIGS. 8 and 9 show an alternative embodiment of the invention, where, compared to FIG. 4, the pitch axis is angled the other way. When the blade 202 with a pitch axis oriented as shown in FIG. 8 is pitched to the effect that the rear edge 702 is turned up into the wind (negative pitch angle 801), the blade is thereby also turned forwards and out of the original rotor plane 204. The advantages of this are the same as mentioned above in the context of FIG. 4. Thus, the embodiment is particularly advantageous in case of actively stall-adjusted turbines where, in operation, a negative pitch angle 801 is imparted to the blades to provoke stall and hence reduce the power output.

Figure 10:
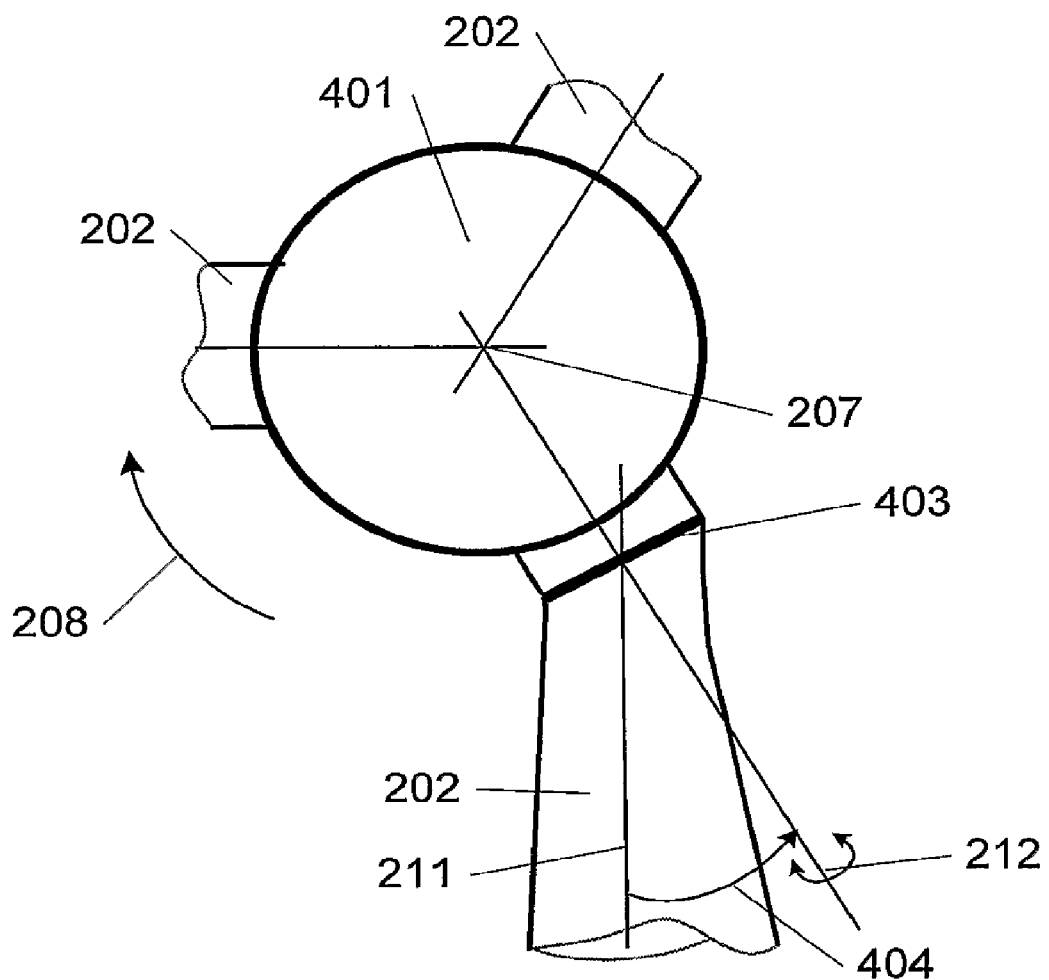
FIG. 10 is a sectional view of a wind power plant, about the hub, seen in a front view, and with a pitch axis and an angled blade according to an embodiment of the invention.

It is common for the embodiments outlined in FIGS. 4 and 8 that the pitch axis 212 is not conveyed through the centre of rotation 207 of the rotor. As opposed to this, the pitch axis as shown in FIG. 10 and according to yet another embodiment of the invention extends through the centre of rotation 207 of the rotor, but is still angled 404 relative to the longitudinal axis 211 of each blade. In this embodiment and like the embodiment shown in FIG. 4, a pitch of the leading edge of the blade into the wind, results in the blade 202 being turned forwards and out of the original rotor plane, the pitch axis 212 being here, too, angled downstream or opposite the direction of revolution 208 relative to the longitudinal axis 211. The shown embodiment, where the blade 202 is mounted non-radially in the hub, is also advantageous in that, here, the blade 202 passes the tower gradually, to the effect that the blade tip passes the tower before the blade root. Hereby it is accomplished that the noise and the force fluctuations on the blade due to the tower passage are reduced. Like in the earlier shown embodiments, the size of the angle 404 between pitch axis and the longitudinal axis of the blade can be selected in response to the length of the blade and the magnitudes of turning desired.

Figure 11:
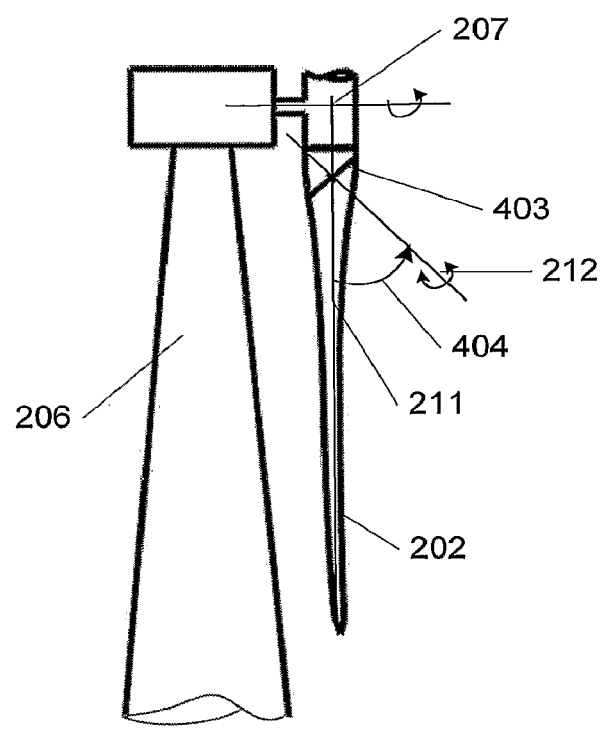
FIG. 11 shows a wind power plant, from the hub and downwards, seen in a lateral view, and with a pitch axis angled out of the rotor plane according to an embodiment of the invention.
Figure 12:
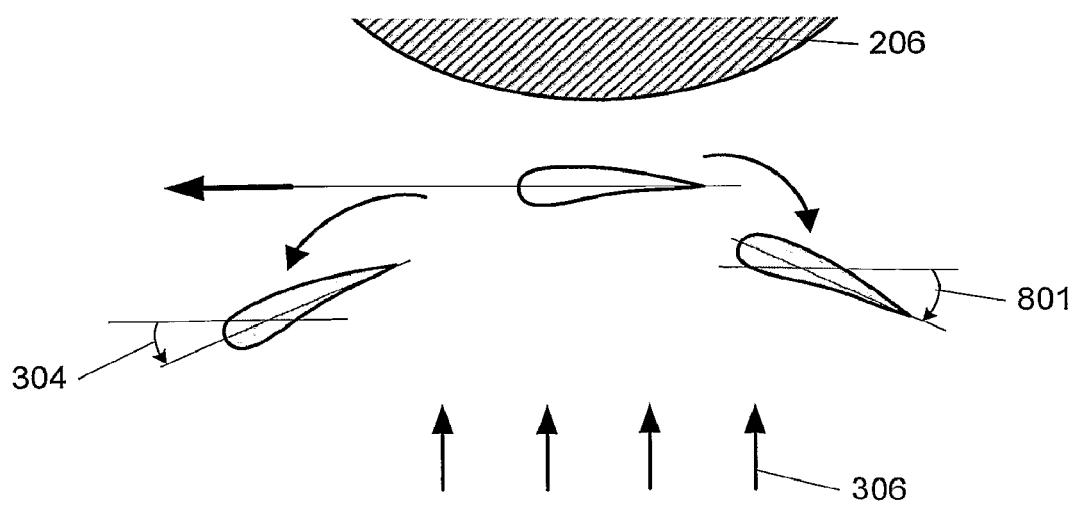
FIG. 12 shows the passage of a blade past the tower, seen from above, without pitch and with a positive and a negative pitch, in accordance with a pitch axis as outlined in FIG. 11.

Yet another embodiment of the invention is shown in FIG. 11, where a wind power plant is depicted, seen from the hub and downwards, in a lateral view, with a blade 202 in vertical, downwardly suspended position. In this embodiment the pitch axis 212 of the blade is arranged to be turned out by an angle 404 relative to the longitudinal axis 211 of the blade and out of the original rotor plane. Here, the pitch axis 212 is likewise not taken through the centre of rotation 207 of the rotor. Both a positive pitch angle, where the leading edge of the blade is turned into the wind, and a negative pitch angle will, in this case, result in the blade being taken forwards in the wind and in that the distance between the outermost part of the blade and the tower 206 being increased during tower passage. The resulting movement of a blade profile a distance further down the blade due to both positive 304 and negative 801 pitches about such pitch axis 212 is depicted in FIG. 12. Again, the magnitude of the increase in clearance depends on how much the pitch axis is angled and how far down the blade 202 the pitch bearing 403 is arranged.

According to a further embodiment of the invention, the pitch axis is turned at an angle, both out of the rotor plane and at an angle relative to the longitudinal axis of the blade in the rotor plane. The embodiments as outlined in FIGS. 4, 8, 10 and 11 can thus be combined depending on which movement of the blade is desirable when pitching.

DEFINITIONS

Pitch: within the field of aerodynamics the angle between the direction of the free flow of air and the cord line in a blade profile. In case of a positive pitch angle the leading edge of the blade is turned up into the wind.

Pitch axis: the axis about which the blade is pitched. Conventionally, a blade is pitched about its longitudinal axis.

It will be understood that the invention as exemplified by the above embodiments and taught in the present description and figures can be modified or changed, while continuing to be comprised by the scope of protection of the following patent claims.

The invention claimed is:

1. A blade for a wind power plant, said blade including at least one assembly face for mounting in a circular pitch bearing with a pitch axis angled relative to the longitudinal axis of the blade, and said blade comprising a root part with an approximately elliptic cross-section approximately perpendicular to the longitudinal axis of the blade, in which root part the at least one assembly face is arranged.

2. The blade for a wind power plant according to claim 1, further comprising at least one pitch bearing.

3. A wind power plant including a tower and a rotor with a number of blades, wherein:
at least one blade according to claim 1 is mounted turnably in a pitch bearing,
the longitudinal axis of the at least one blade is angled relative to the pitch axis of the at least one blade, and
a distance between an outermost part of the at least one blade and the tower increases when a leading edge of the at least one blade turns into a wind impacting the leading edge of the at least one blade.

4. The wind power plant according to claim 3, wherein the pitch axis of at least one blade angles out of a rotor plane.

5. The wind power plant according to claim 3, wherein the pitch axis of the at least one blade angles at an angle opposite a direction of rotation relative to the longitudinal axis of the at least one blade.

6. The wind power plant according to claim 3, further comprising one or more wind velocity meters configured to measure a velocity of the wind, the wind velocity being used to control the pitch of the at least one blade.

7. The wind power plant according to claim 3, further comprising one or more position meters configured to measure a position of at least one blade, the position being used to control the pitch of the at least one blade.

8. The wind power plant according to claim 3, further comprising one or more distance meters configured to measure a distance of the at least one blade to the tower, the distance being used to control the pitch of the at least one blade.

9. A method of controlling a wind power plant, comprising:
providing at least one blade in accordance with claim 1; and
increasing a rotor area of the wind power plant during operation by regulating the pitch of the at least one blade about the pitch axis of the at least one blade relative to the longitudinal axis of the at least one blade.

10. A method of controlling a wind power plant, comprising:
providing at least one blade in accordance with claim 1;
increasing a distance between an outermost part of the at least one blade and a wind power plant tower during operation by regulating a pitch of the at least one blade about a pitch axis of the at least one blade relative to the longitudinal axis of the at least one blade.

11. The method of controlling a wind power plant in accordance with claim 9, further comprising using a velocity of the wind to regulate the pitch of the at least one blade.

12. The method of controlling a wind power plant in accordance with claim 9, wherein the pitch of each blade is individually adjusted.

13. The method of controlling a wind power plant in accordance with claim 9, wherein the pitch of the at least one blade is changed cyclically.

14. The method of controlling a wind power plant in accordance with claim 9, wherein the pitch of the at least one blade is changed between −10 and +30 degrees.

* * * * *